United States Patent
Murayama et al.

(10) Patent No.: US 10,006,534 B2
(45) Date of Patent: Jun. 26, 2018

(54) BEARING HOLDER, BEARING MECHANISM, AND STRAIN WAVE GEARING DEVICE

(71) Applicant: Harmonic Drive Systems Inc., Shinagawa-ku, Tokyo (JP)

(72) Inventors: Yuya Murayama, Azumino (JP); Yoshihide Kiyosawa, Azumino (JP)

(73) Assignee: HARMONIC DRIVE SYSTEMS INC., Shinagawa-ku, Tokyo (JP)

( * ) Notice: Subject to any disclaimer, the term of this patent is extended or adjusted under 35 U.S.C. 154(b) by 299 days.

(21) Appl. No.: 14/890,605

(22) PCT Filed: Jun. 20, 2013

(86) PCT No.: PCT/JP2013/003877
§ 371 (c)(1),
(2) Date: Nov. 12, 2015

(87) PCT Pub. No.: WO2014/203295
PCT Pub. Date: Dec. 24, 2014

(65) Prior Publication Data
US 2016/0084367 A1   Mar. 24, 2016

(51) Int. Cl.
*F16H 35/00* (2006.01)
*F16C 33/38* (2006.01)
(Continued)

(52) U.S. Cl.
CPC ......... *F16H 49/001* (2013.01); *F16C 25/083* (2013.01)

(58) Field of Classification Search
CPC ......... F16H 49/001; F16C 19/04; F16C 19/06
(Continued)

(56) References Cited

U.S. PATENT DOCUMENTS 5,816,624 A * 10/1998 Smith ............... F16L 27/082
                                                          285/276
9,382,993 B2 * 7/2016 Murayama ............ F16H 49/001
(Continued)

FOREIGN PATENT DOCUMENTS

JP        62-159380 A    7/1987
JP         1-229140 A    9/1989
(Continued)

OTHER PUBLICATIONS

International Search Report (PCT/ISA/210) dated Aug. 27, 2013, by the Japanese Patent Office as the International Searching Authority for International Application No. PCT/JP2013/003877.

*Primary Examiner* — Ha Dinh Ho
(74) *Attorney, Agent, or Firm* — Buchanan Ingersoll & Rooney PC

(57) ABSTRACT

In this hollow strain wave gearing unit, a shaft end part of a hollow rotary shaft of a wave generator is located inside a cup-shaped flexible external gear. The shaft end part is supported by a bearing attached to a bearing holder that is fixed to a boss of the flexible external gear. In the bearing holder, an elastic leaf spring part that is displaceable in the axial direction constitutes a part that supports a holder body part that holds the bearing. A preload is applied by the leaf spring part to the bearing in the axial direction. Thus, there is no need to separately arrange a preload application member inside the flexible external gear, and the axial length of the hollow strain wave gearing unit can be shortened.

5 Claims, 5 Drawing Sheets

(51) Int. Cl.
*F16H 49/00* (2006.01)
*F16C 25/08* (2006.01)

(58) Field of Classification Search
USPC .................. 74/640; 384/523, 526, 535, 614
See application file for complete search history.

(56) References Cited

U.S. PATENT DOCUMENTS

| | | | |
|---|---|---|---|
| 9,523,421 B2* | 12/2016 | Murayama | ............ F16H 49/001 |
| 2002/0135241 A1 | 9/2002 | Kobayashi et al. | |
| 2011/0116962 A1* | 5/2011 | Kanayama | ............. H02K 7/003 |
| | | | 418/191 |
| 2012/0051681 A1 | 3/2012 | Takahashi et al. | |

FOREIGN PATENT DOCUMENTS

| | | |
|---|---|---|
| JP | 2002-243000 A | 8/2002 |
| JP | 2006-144971 A | 6/2006 |
| JP | 2007-255681 A | 10/2007 |
| JP | 2010-091065 A | 4/2010 |
| JP | 2012-052569 A | 3/2012 |

\* cited by examiner

BEARING HOLDER, BEARING MECHANISM, AND STRAIN WAVE GEARING DEVICE

TECHNICAL FIELD

The present invention relates to a bearing holder having a bearing preload function, a bearing mechanism using this bearing holder, and a strain wave gearing device using this bearing holder.

BACKGROUND ART

Common known examples of methods for applying a preload to a bearing in the axial (thrust) direction include a fixed-position preload structure incorporating a screw or the like, and a constant-pressure preload structure incorporating a spring or the like. Patent Document 1 discloses a bearing device comprising a fixed-position preload structure, and Patent Document 2 discloses a preload device comprising a constant-pressure preload structure.

A device comprising a cup-shaped flexible externally toothed gear is a known example of a hollow strain wave gearing unit comprising a device hollow part passing through in the axial direction. Patent Document 3 discloses a hollow actuator having a configuration in which a hollow motor is integrally formed in the axial direction with a hollow strain wave gearing reducer comprising a cup-shaped flexible externally toothed gear.

The wave generator of the strain wave gearing reducer disclosed in Patent Document 3 comprises a hollow rotating shaft, an ellipsoidally contoured cam plate (plug) integrally formed on the external peripheral surface portion of the hollow rotating shaft positioned on the inner side of the flexible externally toothed gear, and a wave generator bearing attached to the ellipsoidal external peripheral surface of the cam plate. A shaft end part of the hollow rotating shaft positioned on the inner side of the flexible externally toothed gear is supported by a bearing held in a bearing holder mounted on a boss of the flexible externally toothed gear. A preload is applied to the bearing held in the bearing holder from the side opposite the boss, and the preload is applied by a constant-pressure preload structure incorporating a coil spring.

PRIOR ART DOCUMENTS

Patent Documents

[Patent Document 1] JP-A 2010-91065
[Patent Document 2] JP-A 2012-52569
[Patent Document 3] JP-A 2006-144971

SUMMARY OF THE INVENTION

Problems to be Solved by the Invention

A fixed-position preload structure incorporating a screw or the like requires screw-tightening clearance. A constant-pressure preload structure incorporating a coil spring, a wave washer, a disc spring, or the like also requires that space be ensured for installing these preload-applying components. Therefore, a device incorporated with a bearing comprising a preload structure has overall greater axial length.

For example, in the strain wave gearing device comprising a cup-shaped flexible externally toothed gear disclosed in Patent Document 3, if the preload structure of the bearing supported on the bearing holder can be one that needs only a small axial-direction installation space, it is preferred because the axial length can be shortened.

In view of these matters, an object of the present invention is to provide a bearing holder suitable for configuring a preload structure having a small number of components and a small axial-direction installation space.

Another object of the present invention is to provide a bearing mechanism having few components and a short axial length, in which a preload structure is configured using the bearing holder.

Yet another object of the present invention is to provide a strain wave gearing device that uses the bearing mechanism and has a short axial length.

Means Used to Solve the Above-Mentioned Problems

To solve the problems described above, the bearing holder of the present invention is characterized by comprising:
a flange part mounted on another member;
a holder body part for holding an outer race of a bearing; and
a plate spring part for connecting the flange part and the holder body part; wherein
the flange part, the plate spring part, and the holder body part are integrally formed components comprising a single member; and
the plate spring part has spring properties that enable the holder body part to be urged in a direction of a center axis thereof.

Part of the bearing holder of the present invention is a plate spring part. When the bearing holder has been mounted to a member for mounting and the bearing is held, if the plate spring part is displaced in the direction of the center axis, a preload is applied to the held bearing in the direction of the center axis. Because the bearing holder is provided with a bearing preload function in addition to the bearing holding function, there is no need to include a separate spring, screw, or other component for preloading. It is thereby possible to achieve a bearing mechanism that comprises a preload structure needing only a small axial-direction installation space. In a device comprising a rotary member supported by this bearing mechanism, the axial length can be shorter than when a bearing mechanism of a conventional configuration is used.

The holder body part comprises a circular internal peripheral surface to which the outer race of the bearing is attached, and an outer race receiving surface composed of an annular stepped surface formed perpendicular to the center axis at one end of the circular inner peripheral surface. The plate spring part is formed between the holder body part and the flange part, and the plate spring part extends in a direction perpendicular to the center axis. The flange part can also be an annular flange part.

Next, the present invention is directed to a bearing mechanism for rotatably supporting a shaft end part of the hollow rotating shaft, the bearing mechanism characterized by comprising:
a bearing for supporting one shaft end part of the hollow rotating shaft;
a bearing holder for holding the bearing; and
a mounting member on which the bearing holder is mounted; herein
the shaft end part has a circular external peripheral surface for fitting an inner race of the bearing, and an inner race receiving surface having an annular stepped surface formed in an end of the circular external peripheral surface;

the bearing holder is the bearing holder of the configuration described above; and a preload force is applied to the bearing by an urging force generated by the plate spring part of the bearing holder, the preload force being applied in the direction in which the inner race of the bearing is pressed against the inner race receiving surface.

A strain wave gearing of the present invention is characterized by comprising:

a rigid internally toothed gear;

a cup-shaped flexible externally toothed gear disposed on the inner side of the rigid internally toothed gear and capable of meshing with the rigid internally toothed gear;

a wave generator disposed on the inner side of the flexible externally toothed gear and causing the flexible externally toothed gear to flex into an ellipsoidal shape and partially mesh with the rigid internally toothed gear;

a boss defining the center portion of the cup bottom surface of the flexible externally toothed gear; and a bearing mechanism for rotatably supporting a shaft end part of the wave generator on the side facing the boss; wherein the bearing mechanism is the bearing mechanism of the configuration described above; and the bearing holder is fixed to the boss on the inner side of the flexible externally toothed gear that is the mounting member.

In the strain wave gearing device of the present invention, the shaft end part of the wave generator positioned on the inner side of the cup-shaped flexible externally toothed gear is supported by the bearing mechanism incorporating the bearing holder having a preload function. Accordingly, there is no need to include, on the inner side of the flexible externally toothed gear, a spring, a screw, or another preload-applying component for applying a preload in the axial direction to the bearing held in the bearing holder. Consequently, the axial length of the strain wave gearing device can be reduced. Assembly is easy because the number of components is small, and manufacturing costs can be reduced as well.

The present invention can be applied to a hollow strain wave gearing device comprising a device hollow part passing through in the axial direction of the device. In this case, the wave generator comprises a hollow rotating shaft, a plug formed on the external peripheral surface of the hollow rotating shaft, and the wave generator bearing attached to the ellipsoidal external peripheral surface of the plug. The shaft end part of the wave generator is a boss-side shaft end part on the side of the hollow rotating shaft that faces the boss, and the boss of the flexible externally toothed gear is an annular boss. The bearing holder comprises an annular boss-fixing part fixed to a center through-hole of the boss. The center through-hole of the boss-fixing part and the hollow part of the hollow rotating shaft are coaxially aligned, and a device hollow part passing through in the axial direction of the device is formed.

When the strain wave gearing device is used as a unit, the strain wave gearing device comprises:

a first end plate fixed to the rigid internally toothed gear and a second end plate fixed to the external peripheral surface of the boss of the flexible externally toothed gear;

a device bearing for supporting the rigid internally toothed gear and the second end plate in a state that permits relative rotation therebetween; and a bearing attached to the internal peripheral surface of a center through-hole formed in the first end plate, and rotatably supporting, from the external peripheral side, a shaft end part of the hollow rotating shaft on the side opposite the boss-side shaft end part.

In this case, concerns associated with reducing the number of components, reducing the number of assembly steps, etc. make it desirable to form the first end plate from a single component with the rigid internally toothed gear and to form the second end plate from a single component with one raceway of the device bearing. The rigid internally toothed gear, the first end plate, and the other raceway of the device bearing can also be formed from a single component.

MODE FOR CARRYING OUT THE INVENTION

Figure 1:
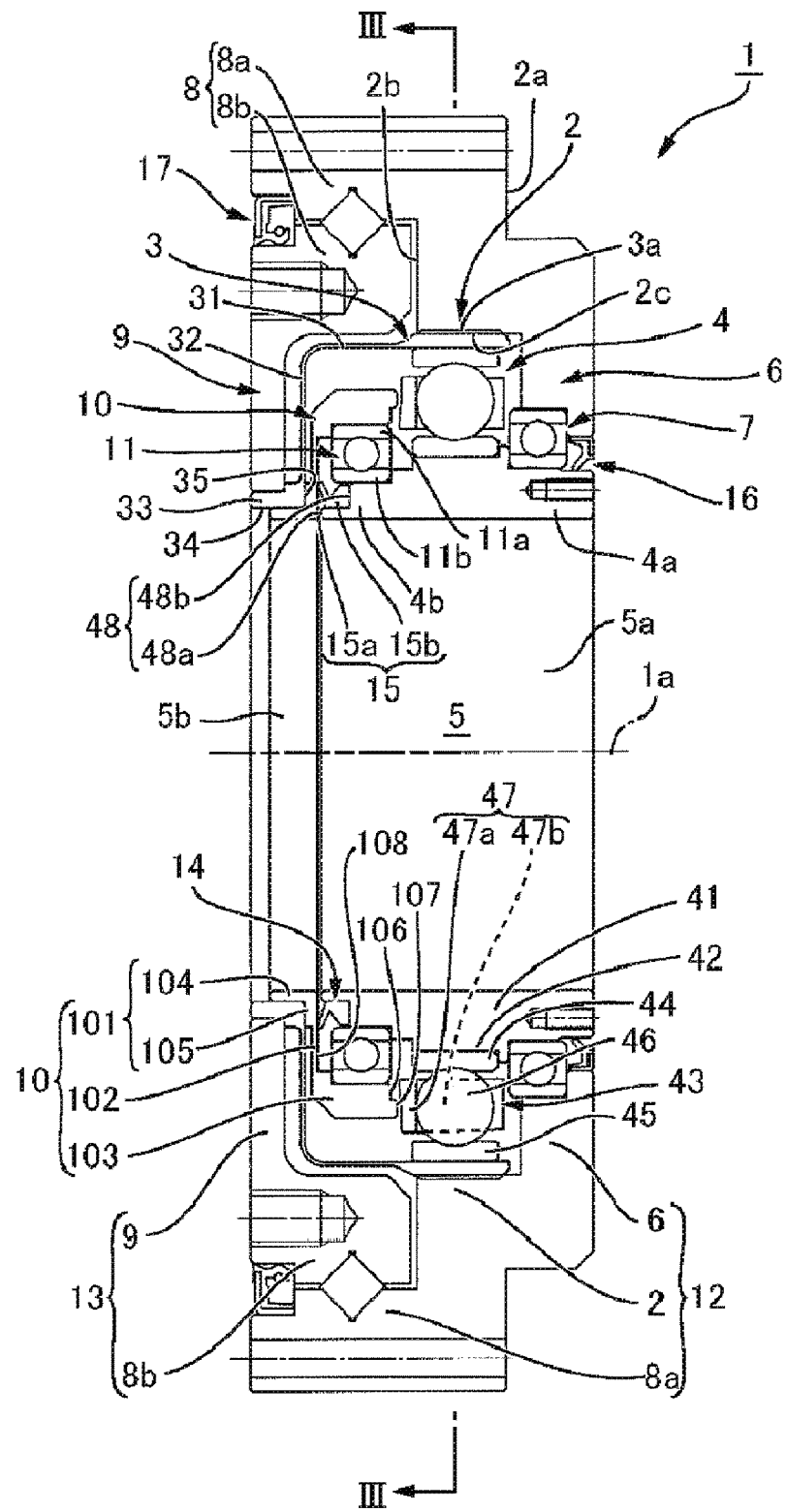
FIG. 1 is a longitudinal cross-sectional view of a hollow strain wave gearing unit to which the present invention is applied.
Figure 2:
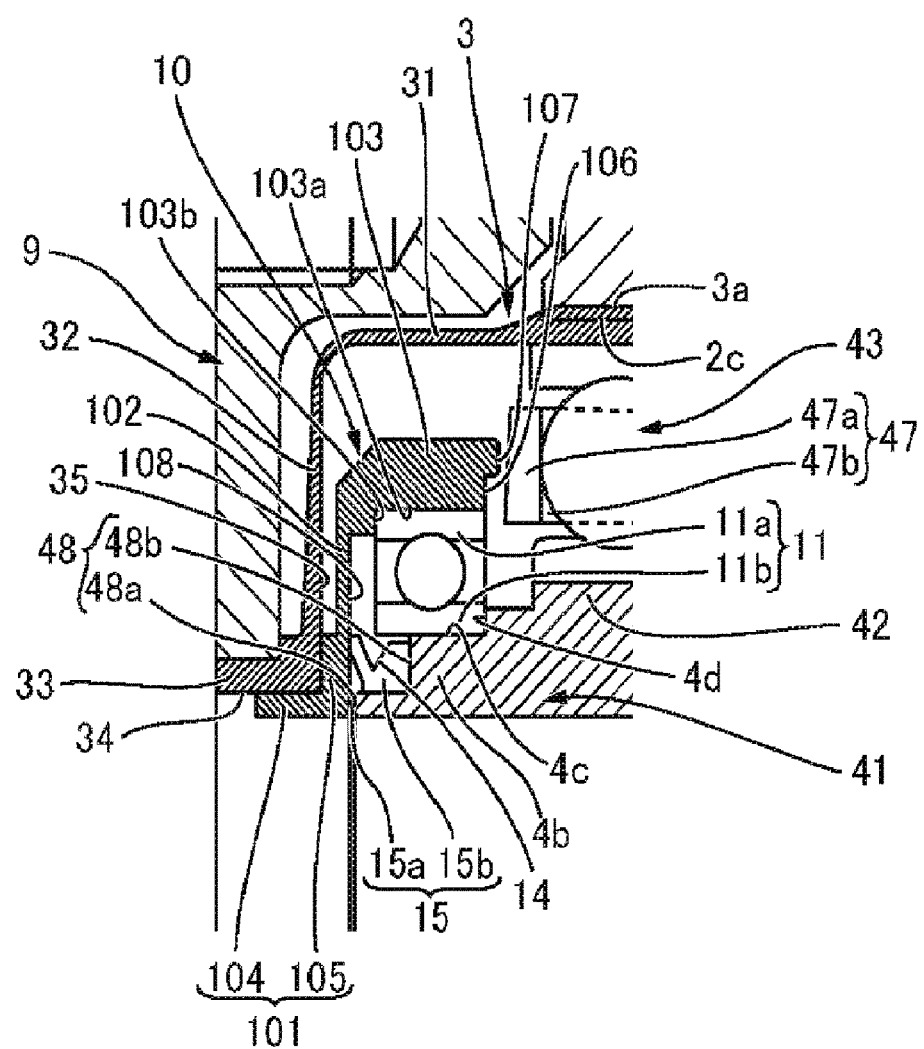
FIG. 2 is a partial enlarged cross-sectional view showing an enlargement of a part of FIG. 1.
Figure 3:
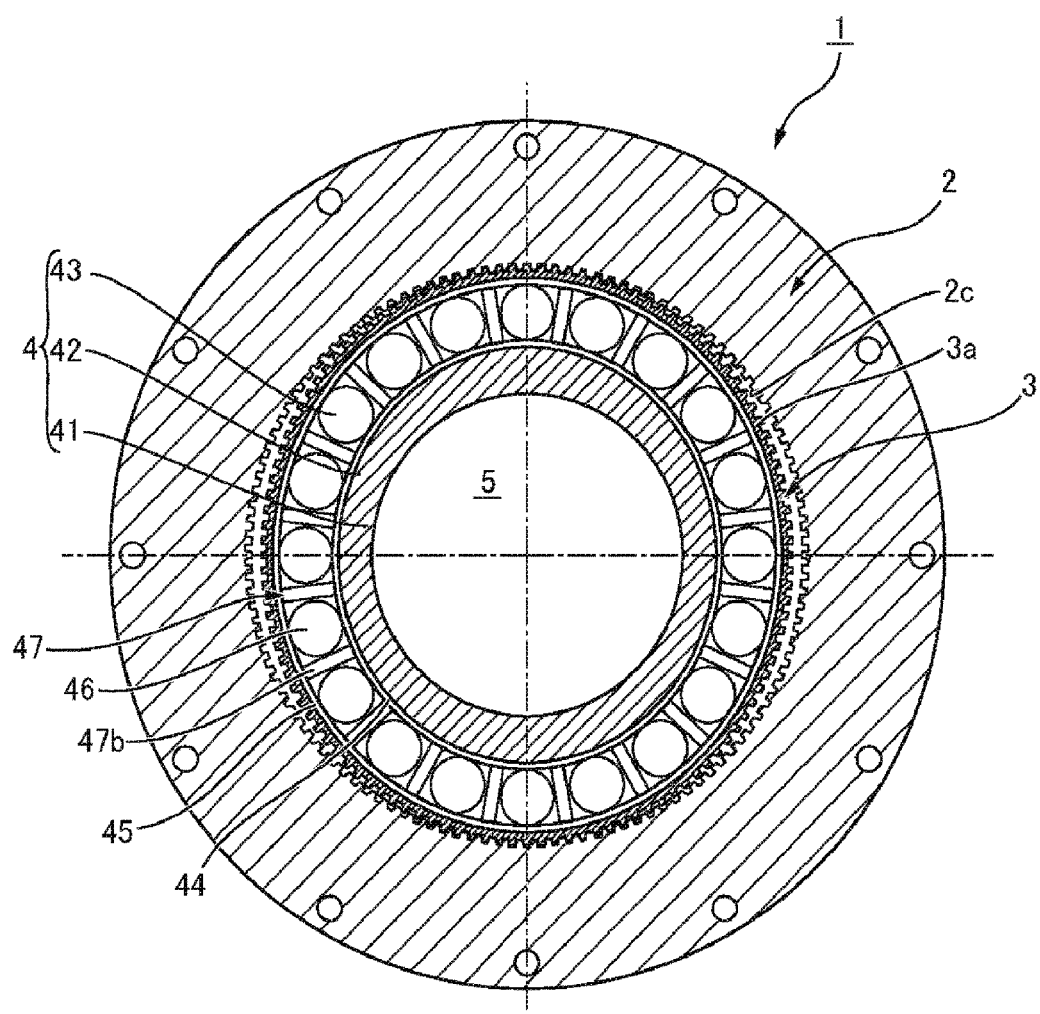
FIG. 3 is a transverse cross-sectional view of the portion sectioned by line in FIG. 1.

Embodiments of a hollow strain wave gearing unit to which the present invention is applied are described below with reference to the drawings. FIG. 1 is a longitudinal cross-sectional view of a hollow strain wave gearing unit according to the present embodiment, FIG. 2 is a partial enlarged cross-sectional view showing an enlargement of a part thereof, and FIG. 3 is a transverse cross-sectional view of the portion sectioned by line in FIG. 1.

(Overall Configuration)

The hollow strain wave gearing unit 1 (sometimes referred to hereinafter simply as the "strain wave gearing unit 1") comprises an annular rigid internally toothed gear 2 of rectangular cross-section. A cup-shaped flexible externally toothed gear 3 is disposed coaxially on the inner side of the rigid internally toothed gear 2. Disposed on the inner side of the flexible externally toothed gear 3 is a wave generator 4 for causing the flexible externally toothed gear 3 to flex into an ellipsoidal shape and partially mesh with the rigid internally toothed gear 2. Also formed in the strain wave gearing unit 1 is a unit hollow part 5 extending through the center portion in the direction of the axis 1a.

A disc-shaped first unit end plate 6 is integrally formed on one end surface 2a of the rigid internally toothed gear 2. These portions 2, 6 can also be fastenably fixed together as separate members. The first unit end plate 6 extends in a direction perpendicular to the axis 1a. A first bearing 7 is attached to the internal peripheral surface of a center through-hole of the first unit end plate 6, and one first shaft end part 4a of the wave generator 4 is rotatably supported by the first bearing 7. A cross roller bearing 8, which is a unit bearing, is adjacently disposed on the side of the other end surface 2b of the rigid internally toothed gear 2.

An outer race 8a of the cross roller bearing 8 is integrally formed on the end surface 2b of the rigid internally toothed gear 2. These portions 2, 8a can also be separate members that are fastenably fixed together. A disc-shaped second unit end plate 9 is integrally formed on the end surface on the side opposite the rigid internally toothed gear 2 in an inner race 8b of the cross roller bearing 8. These portions 9, 8b can also be separate members that are fastenably fixed together. The disc-shaped second unit end plate 9, which extends in a direction perpendicular to the axis 1a, is fixed to the external peripheral surface of an annular boss 33 that defines the center portion of the cup-bottom surface of the cup-shaped flexible externally toothed gear 3.

A bearing holder 10 fixed to the boss 33 is disposed on the inner side of the flexible externally toothed gear 3. A second bearing 11 is attached to the bearing holder 10. A second shaft end part 4b on the side facing the boss 33 in the wave generator 4 is rotatably supported by the second bearing 11.

For example, the rigid internally toothed gear 2 is fastenably fixed to a fixed-side member (not shown), the first shaft end part 4a of the wave generator 4 is connected to a motor shaft (not shown) or another high-speed rotating shaft, and the second unit end plate 9 fixed to the flexible externally toothed gear 3 is fastened to a driven-side member (not shown). In this case, the rigid internally toothed gear 2, the first unit end plate 6, and the outer race 8a of the cross roller bearing 8 are integrally formed into a component that constitutes a fixed-side unit housing 12 of the strain wave gearing unit 1. The inner race 8b of the cross roller bearing 8 and the second unit end plate 9 are integrally formed into a component that constitutes a rotating-side unit housing 13 of the strain wave gearing unit 1.

When the wave generator 4 is rotated, the positions where the external teeth 3a of the flexible externally toothed gear 3 mesh with the internal teeth 2c of the rigid internally toothed gear 2 move in the circumferential direction. The number of teeth of the flexible externally toothed gear 3 is 2n (n being a positive integer), usually 2 (n=1), fewer than the number of teeth of the rigid internally toothed gear 2. Therefore, when the meshing positions move in the circumferential direction, relative rotation corresponding to the difference in the number of teeth occurs between the two gears 2, 3. Reduced rotation that is reduced in speed according to the difference in the number of teeth is outputted from the flexible externally toothed gear 3 to the drive-side member (not shown) via the second unit end plate 9.

Next, the configurations of the components will be described in detail. First, the wave generator 4 comprises a hollow rotating shaft 41, an ellipsoidally contoured plug 42 of a given width formed integrally on the external peripheral surface of the hollow rotating shaft 41, and a wave generator bearing 43 attached to the ellipsoidal external peripheral surface of the plug 42. The hollow part of the hollow rotating shaft 41 defines a circular cross-sectioned wave-generator-side hollow part 5a extending in the direction of the axis 1a through the wave generator 4. One shaft end part of the hollow rotating shaft 41 is the first shaft end part 4a of the wave generator 4, and the other shaft end part is the second shaft end part 4b of the wave generator 4. The second shaft end part 4b is a boss-side shaft end part positioned on the side of the boss 33 of the flexible externally toothed gear 3.

The wave generator bearing 43 comprises an inner race 44 and an outer race 45 capable of flexing in the radial direction. A plurality of balls 46 are inserted in a rollable state into the annular trajectory between the inner and outer races 44, 45. The balls 46 are held at given angular intervals in the circumferential direction by an annular retainer 47. The retainer 47 comprises an annular plate 47a, and partitioning plates 47b extending orthogonally (in the direction of the axis 1a) at a given angular interval from the end surface of the annular plate 47a. A pocket for each of the balls 46 is formed between the adjacent partitioning plates 47b. The retainer 47 is attached between the inner and outer races 44, 45 from the side of the second unit end plate 9 along the direction of the axis 1a.

The flexible externally toothed gear 3 comprises a cylindrical barrel part 31 capable of flexing in the radial direction, a disc-shaped diaphragm 32 extending radially inward from one end of the cylindrical barrel part 31, and an annular boss 33 formed on the internal peripheral edge of the diaphragm 32. The external teeth 3a are formed on the external peripheral surface portion in the other open end of the cylindrical barrel part 31. The boss 33 is fixed with no gap to the circular inner peripheral surface of the second unit end plate 9 by press fitting, bonding, welding, or the like. The bearing holder 10 is fixed with no gap in the circular center through-hole of the boss 33 from the side opposite the second unit end plate 9 by press fitting, bonding, welding, or the like.

(Bearing Holder)

The bearing holder 10 comprises an annular boss-fixing part 101 (a flange part), a thin, disc-shaped plate spring part 102 extending radially outward from the boss-fixing part 101, and an annular holder body part 103 extending in the axial direction from the external peripheral edge of the plate spring part 102 toward the first unit end plate 6. The boss-fixing part 101 has an L-shaped cross-sectional shape comprising an insertion part 104 fixed to a circular internal peripheral surface 34 of the boss 33, and an annular part 105 extending along an annular end surface 35 on the inner side of the boss 33. The second bearing 11 is held on the inner side of the holder body part 103. The boss-fixing part 101, the plate spring part 102, and the holder body part 103 are integrally formed articles composed of a single member. The plate spring part 102 is elastic enough to urge the holder body part 103 in the direction of the axis 1a.

A circular internal peripheral surface 103a for attaching an outer race is formed in the holder body part 103, as shown in FIG. 2. An outer race receiving surface 103b, composed of an annular stepped surface of a given width perpendicular to the axis 1a, is formed in the end of the circular internal peripheral surface 103a on the side of the second unit end plate 9. The outer race receiving surface 103b is a surface facing the side of the first unit end plate 6. An outer race 11a of the second bearing 11 is attached to the circular internal peripheral surface 103a, and the annular end surface of the outer race is in contact with the outer race receiving surface 103b. The plate spring part 102 extends in a direction perpendicular to the axis 1a. The plate spring part 102 connects together an end part of the holder body part 103 that is nearer to the second unit end plate 9 than the outer race receiving surface 103b, and the external peripheral surface of the annular part 105 of the boss-fixing part 101.

A circular external peripheral surface 4c for attaching an inner race is formed in the circular external peripheral surface of the second shaft end part 4b of the hollow rotating shaft 41. An inner race receiving surface 4d, composed of an annular stepped surface of a given width perpendicular to the axis 1a, is formed in the end of the circular external peripheral surface 4c on the side near the first shaft end part 4a. The inner race receiving surface 4d is a surface facing the side of the second unit end plate 9. An inner race 11b of the second bearing 11 is attached to the circular external peripheral surface 4c, and the annular end surface of the inner race is in contact with the inner race receiving surface 4d.

With the second bearing 11 attached, the plate spring part 102 becomes slightly displaced along the axis 1a toward the second unit end plate 9. The elastic return force of the plate spring part 102 in the axial direction causes a preload to be applied to the second bearing 11 in the axial direction (the direction in which the inner race 11b is pushed against the inner race receiving surface 4d).

Thus, the bearing mechanism for rotatably supporting the second shaft end part 4b of the hollow rotating shaft 41 is configured using the bearing holder 10 which has a preload function. There is no need to include a component for applying a preload to the second bearing 11. A bearing mechanism having a preload function can be configured from a small number of components, and the installation space in the axial direction is also small. Consequently, if the bearing mechanism of the present example is used, the axial length of the hollow strain wave gearing unit 1 can be shortened.

Next, in addition to the preload function, the bearing holder 10 also has a retainer bracing function for the wave generator bearing 43. Specifically, the holder body part 103 of the bearing holder 10 comprises an annular holder end surface 106 facing toward the wave generator bearing 43, as can be seen from FIG. 2. The holder end surface 106 is formed in a position where the surface opposes, in the direction of the axis 1a, the annular plate 47a of the retainer 47 of the wave generator bearing 43. An annular protrusion 107 that protrudes slightly toward the retainer 47 is formed in an external peripheral area of the holder end surface 106. The annular protrusion 107 opposes the end surface of the annular plate 47a of the retainer 47 across a tiny gap.

When the retainer 47 moves as though to come out from between the inner and outer races 44, 45 in the direction of the axis 1a, the retainer comes into contact with the annular protrusion 107. The annular protrusion 107 functions as a retainer brace. There is no need to include a retainer bracing plate for the wave generator bearing 43 on the inner side of the flexible externally toothed gear 3. Consequently, the axial length of the hollow strain wave gearing unit 1 can be shortened.

Figure 4:
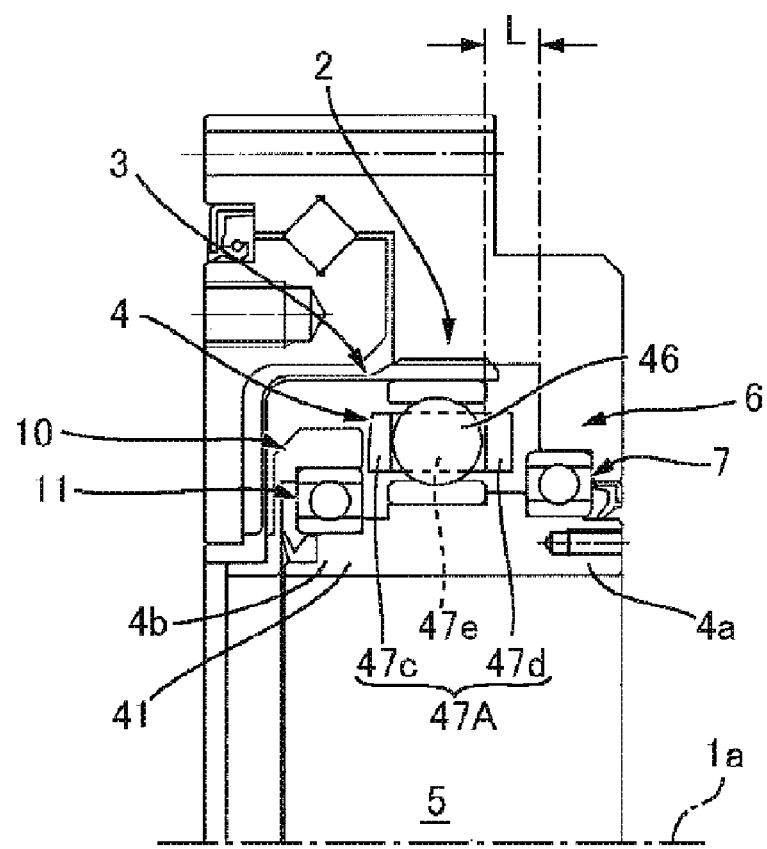
FIG. 4 is a half cross-sectional view showing a hollow strain wave gearing unit including a retainer that does not need a retainer brace.

It is conceivable to use a retainer that does not need a retainer bracing plate in the hollow strain wave gearing unit 1. A retainer 47A in such a case comprises annular plates 47c, 47d positioned on both sides of the balls 46, and partitioning plates 47e are formed between these annular plates, as shown in FIG. 4. Therefore, a space L must be ensured where the annular plate 47d will be placed between the wave generator 4 and the first unit end plate 6 in the direction of the axis 1a. This space requirement is undesirable because it increases the axial length of the hollow strain wave gearing unit 1.

(Seal Mechanism of Hollow Part)

This description refers back to FIGS. 1 and 2. The unit hollow part 5 is configured from the wave-generator-side hollow part 5a defined by the hollow part of the hollow rotating shaft 41 of the wave generator 4, and a boss-side hollow part 5b defined by a center through-hole in the insertion part 104 of the bearing holder 10 fixed to the boss 33 of the flexible externally toothed gear 3. Therefore, an annular gap is formed in the internal peripheral surface of the unit hollow part 5. This gap is sealed by an annular seal member 14 having a V-shaped cross section.

The seal member 14 is fitted in a gap 15 formed between the boss-fixing part 101 of the bearing holder 10 and the second shaft end part 4b of the wave generator 4. The gap 15 comprises an extremely narrow annular gap portion 15a that opens in the circular internal peripheral surface of the unit hollow part 5, and a wide annular gap portion 15b formed in the external peripheral side. The annular seal member 14 is fitted into the gap portion 15b. The gap 15 is thereby sealed and lubricating oil or the like is prevented from leaking out into the unit hollow part 5

The gap 15, comprising the extremely narrow gap portion 15a and the wide gap portion 15b, is formed in the following manner. An end surface portion 108 (boss-side end surface) of the bearing holder 10 facing toward the wave generator 4 is a flat end surface perpendicular to the axis 1a. The end surface of the side of the wave generator 4 that opposes the end surface portion 108 is a shaft end surface 48 of the second shaft end part 4b. This shaft end surface 48 comprises an annular internal peripheral end surface 48a, and an annular external peripheral end surface 48b retreated farther than the internal peripheral end surface 48a in the direction of the axis 1a from the end surface portion 108 of the bearing holder 10. Between the external peripheral end surface 48b and the end surface portion 108 of the bearing holder 10 is the wide annular gap portion 15b. Between the internal peripheral end surface 48a on the inner side and the end surface portion 108 is the extremely narrow gap portion 15a.

Thus, the shaft end surface 48 of the second shaft end part 4b of the hollow rotating shaft 41 is formed into a step shape, and the external peripheral end surface 48b is retreated in the direction of the axis 1a from the internal peripheral end surface 48a. The wide gap portion 15b for attaching the seal member is thereby formed between the external peripheral end surface 48b and the end surface portion 108 on the opposing side of the bearing holder 10. Therefore, the seal member 14 can be placed between the boss-fixing part 101 and the wave-generator-side hollow rotating shaft 41 along the direction of the axis 1a.

Figure 5:
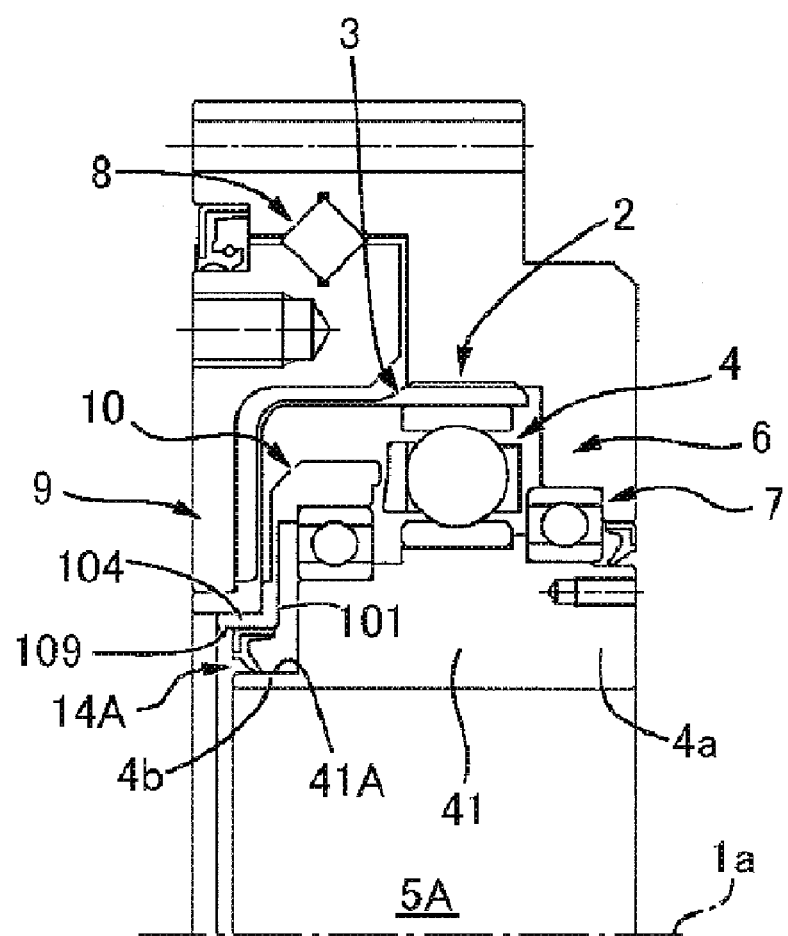
FIG. 5 is a half cross-sectional view showing a hollow strain wave gearing unit including a seal member in the radial direction.

It is conceivable, as show in FIG. 5, to fit a seal member 14A in between an internal peripheral surface 109 of the insertion part 104 of the boss-fixing part 101 and an external peripheral surface portion 41A of the shaft end part 4b of the hollow rotating shaft 41 inserted through the inner side thereof. Specifically, the seal member 14A is placed between the insertion part 104 of the boss-fixing part 101 and the shaft end part 4b of the wave-generator-side hollow rotating shaft 41, along the radial direction. When the seal member 14A is placed in the radial direction, the inside diameter of a unit hollow part 5A is defined by the hollow diameter of the hollow rotating shaft 41 inserted through the inner side of the insertion part 104 of the boss-fixing part 101. This is consequently not suitable for forming a unit hollow part having a large inside diameter. With the strain wave gearing unit 1 of the present example shown in FIGS. 1 to 3, this type of problem can be resolved and a unit hollow part 5 having a large inside diameter can be formed.

In the present example, the gap portion 15b for fitting the seal member is formed as being in the inner side of the inner race 11b of the second bearing 11, as shown in FIGS. 1 and 2. Therefore, the seal member 14 can be placed with the same unit axial length as when the seal member 14 is placed in the radial direction shown in FIG. 5. Consequently, according to the present example, a hollow strain wave gearing unit 1 having a large unit hollow part 5 and a short axial length can be achieved using a cup-shaped flexible externally toothed gear 3.

In the present example, the gap between the internal peripheral surface of the first unit end plate 6 and the external peripheral surface of the first shaft end part 4a is sealed by a first oil seal 16 fitted in an area on the outer side of the first bearing 7, as shown in FIG. 1. On the side having the second unit end plate 9, the gap between the inner race 8b and the outer race 8a of the cross roller bearing 8 is sealed by an annular second oil seal 17.

The invention claimed is:

1. A bearing mechanism for rotatably supporting a shaft end part of a hollow rotating shaft, the bearing mechanism comprising:
   a bearing for supporting the one shaft end part of the hollow rotating shaft;
   a bearing holder for holding the bearing; and
   a mounting member on which the bearing holder is mounted; wherein
   the shaft end part has a circular external peripheral surface for fitting an inner race of the bearing, and an inner race receiving surface having an annular stepped surface formed in an end of the circular external peripheral surface;
   the bearing holder has a flange part mounted on another member, a holder body part for holding an outer race of the bearing, and a plate spring part for connecting the flange part and the holder body part;
   the flange part, the plate spring part, and the holder body part are an integrally formed component composed of a single member;
   the plate spring part has spring properties that enable the holder body part to be urged in a direction of a center axis thereof;
   the holder body part has a circular internal peripheral surface to which the outer race of the bearing is attached, and an outer race receiving surface having an annular stepped surface formed perpendicular to the center axis at one end of the circular inner peripheral surface;
   the plate spring part is formed between the holder body part and the flange part, and formed in a state extending in a direction perpendicular to the center axis; and
   a preload force is applied to the bearing by an urging force generated by the plate spring part of the bearing holder, the preload force being applied in a direction in which the inner race of the bearing is pressed against the inner race receiving surface.

2. A strain wave gearing device comprising:
   a rigid internally toothed gear;
   a cup-shaped flexible externally toothed gear disposed on an inner side of the rigid internally toothed gear and capable of meshing with the rigid internally toothed gear;
   a wave generator disposed on an inner side of the flexible externally toothed gear and causing the flexible externally toothed gear to flex into an ellipsoidal shape and partially mesh with the rigid internally toothed gear;
   a boss defining a center portion of a cup bottom surface of the flexible externally toothed gear; and
   a bearing mechanism for rotatably supporting a shaft end part of the wave generator on a side facing the boss; wherein
   the bearing mechanism is the bearing mechanism according to claim 1; and
   the bearing holder is fixed to the boss on the inner side of the flexible externally toothed gear as the mounting member.

3. The strain wave gearing device according to claim 2, wherein
   the wave generator has a hollow rotating shaft, a plug formed on an external peripheral surface of the hollow rotating shaft, and a wave generator bearing attached to an ellipsoidal external peripheral surface of the plug;
   the shaft end part of the wave generator is a boss-side shaft end part on a side of the hollow rotating shaft that faces the boss;
   the boss of the flexible externally toothed gear is an annular boss;
   the bearing holder has an annular boss-fixing part fixed to a center through-hole of the boss; and
   a center through-hole of the boss-fixing part and a hollow part of the hollow rotating shaft are coaxially aligned to form a device hollow part passing through in a direction of a device axis.

4. The strain wave gearing device according to claim 3, comprising:
   a first end plate fixed to the rigid internally toothed gear;
   a second end plate fixed to the boss of the flexible externally toothed gear;
   a device bearing for supporting the rigid internally toothed gear and the second end plate in a state that permits relative rotation therebetween; and
   a second bearing attached to an internal peripheral surface of a center through-hole formed in the first end plate, and rotatably supporting, from an external peripheral side, a second shaft end part of the hollow rotating shaft on a side opposite the boss-side shaft end part.

5. The strain wave gearing device according to claim 4, wherein
   the rigid internally toothed gear and the first end plate are formed as a single component; and
   one raceway of the device bearing and the second end plate are formed as another single component.

* * * * *